United States Patent [19]
Federighi et al.

[11] Patent Number: 5,956,728
[45] Date of Patent: Sep. 21, 1999

[54] OBJECT GRAPH EDITING CONTEXT AND METHODS OF USE

[75] Inventors: Craig Federighi, Mountain View; Dan Willhite, San Francisco; Eric Noyau, Mountain View, all of Calif.

[73] Assignee: NeXT Software, Inc., Redwood City, Calif.

[21] Appl. No.: 08/682,198

[22] Filed: Jul. 17, 1996

[51] Int. Cl.[6] .................................................. G06R 17/00
[52] U.S. Cl. ........................... 707/103; 707/10; 707/104; 707/203
[58] Field of Search ........................ 707/1–10, 100–104, 707/200–206; 395/182.18, 705, 182.13–182.19, 702–704, 710, 683, 684, 685

[56] References Cited

U.S. PATENT DOCUMENTS

| | | | |
|---|---|---|---|
| 5,151,987 | 9/1992 | Abraham et al. | 395/182.18 |
| 5,317,730 | 5/1994 | Moore et al. | 707/200 |
| 5,536,386 | 7/1996 | Wang | 707/203 |
| 5,715,460 | 2/1998 | Acker et al. | 395/705 |
| 5,748,188 | 5/1998 | Hu et al. | 707/104 |

FOREIGN PATENT DOCUMENTS 0425415   5/1991   European Pat. Off. .

OTHER PUBLICATIONS

Kelter, U. "Transaktionskonzepte Für Non–Standard–Datenbanksysteme," Informationstechnik It, vol. 30, No. 1, 1988, pp. 17–27.

Kleissner, C. "Enterprise Objects™ Framework: A second generation object–relational enabler," 1995 ACM Sigmod International Conference on Management of Data, San Jose, California, U.S.A., May 22–25, 1995, vol. 24, No. 2, pp. 455–459.

"Enterprise Objects™ Framework: Building Reusable Business Objects," NeXT Computer Publication, Jul. 1994, Redwood City, California, U.S.A., pp. 1–12.

*Primary Examiner*—Thomas G. Black
*Assistant Examiner*—David Yiuk Jung
*Attorney, Agent, or Firm*—Hecker & Harriman

[57] ABSTRACT

The present invention comprises a novel system for managing changes to a graph of data bearing objects In one embodiment, an object graph manager object referred to as an editing context is used to identify changes made to data bearing enterprise objects and to notify other interested objects when changes occur. As a result, data bearing objects need not themselves contain code necessary for monitoring changes. In another embodiment of the invention, the editing context is used to provide event-based "undo" capabilities. In another embodiment of the invention, each enterprise object has a primary key that is used to maintain the identification between an enterprise object instance and a corresponding database row. In another embodiment of the invention, multiple levels of editing contexts are used to provide multiple isolated object graphs, each of which allows independent manipulation of the underlying data bearing objects.

24 Claims, 12 Drawing Sheets

OBJECT GRAPH EDITING CONTEXT AND METHODS OF USE

BACKGROUND OF THE INVENTION

1. Field of the Invention

The present invention relates to the field of object oriented application programming environments, particularly for applications accessing databases.

2. Background Art

Object oriented programming languages are non-procedural programming languages in which program elements are viewed as objects that can pass messages to each other. An object includes its own data and programming code and is internally self-reliant. The programming code of an object includes procedures or methods. The methods of an object are invoked by messages received from another object. Each object is an instance of an object class. The properties of the objects in a class are defined by a class definition. A class definition may utilize a hierarchical class structure in which objects in the class inherit properties of a parent class in addition to properties explicitly defined for the class. This inheritance property allows code for object classes to be customized for reuse in different applications, facilitating the sharing of programming code between different programs.

To write an application program in an object oriented programming language, a programmer identifies the real-world objects of a problem, the data and processing requirements of those objects, and the communications needed between the objects, and encapsulates these in class definitions. This process is simplified by taking advantage of the inheritance property of object classes by basing the class definitions to the extent possible on preexisting object classes.

Objects are assembled in a modular fashion to create applications. Objects call on other objects to perform operations or procedures by sending appropriate messages. An appropriate message is a message to which the receiving object can respond. The sending object must therefore know the type of functions that a receiving object can perform and be able to generate the corresponding message that will invoke the desired operation. The sending object must also be prepared to accept and process any resulting response.

Although objects are generally internally self-reliant, and can therefore be viewed as modules that can be assembled with other objects into a variety of application programs, the simple assembling of objects does not create a functional program. The objects must also be able to properly interact and intercommunicate with each other. Although objects represent reusable code, additional code must be written to provide for the generation of appropriate outgoing messages and for processing and responding to incoming messages.

One type of application program that is commonly used in business is a database application program. A database application program is a program that manipulates data stored in a database The database is often managed by a separate program, called a database management program, which has the ability to respond to requests to store, retrieve, search for, extract and update data in the database. In order to access data in the database, the database application program must generate appropriate database requests to the database management program.

There are many types of database structures and many kinds of database management programs. In order to be able to access a particular database, a database application program must know the structure of the database and the syntax used by the database management program. As these can vary from one database to another, a single database application program cannot generally be used with different databases. Instead, separate versions of a database application program are needed to deal with different databases and different database management programs.

Two types of database structures are flat file databases and relational databases.

A flat file database can be viewed as a single large table having a number of rows and a number of columns. Each row ("record") corresponds to a particular entity, and each column of that row ("field") corresponds to a particular attribute of that entity. For example, an employee database may contain information about employees, including name, address, social security number, salary, department, etc. Each row would correspond to a particular employee. Separate columns would correspond to name, address, social security number, salary, department, etc., respectively. One of the columns contains an entry that uniquely identifies each row. This entry is often called the "primary key". For the employee database example, the primary key might be the employee's name, the social security number, or an index number generated by the database management program. To find the salary for Jane Doe in the employee database, for example, one would look in the row corresponding to Jane Doe, and read off the salary in the salary column. In a flat file, the only data available about an entity is the information contained in the row corresponding to the entity, that is, only the information for which there is a column, or "field", in the table.

In a relational database, information in one table may be related to information in other tables. For example, a company database may include an employee name and address table that contains a row for each employee, with fields for the name and address of each employee in each row. The database may also contain a departmental table that contains a row for each department, with each row containing a department ID field as well as fields for the names of all employees in the department. The departmental table may be linked to the employee name and address table by including a field for the department ID in the employee name and address table. This department ID, called a "foreign key", may be viewed as a pointer from the employee name and address table to the departmental table, indicating where additional related data may be found.

An example of a database application program that might use the relational database described in the preceding paragraph is an application that compiles the names and addresses of all employees of a particular department This application might operate as follows. First, the application program requests the database management program to extract the names of all employees in the department in question from the departmental table. To do so, the application program needs to know the structure of the departmental table, and needs to formulate the request in the specific syntax of the database management program. Then, for each employee name obtained, the application program requests the corresponding address from the employee name and address table. Again, the application program must know the structure of the name and address table and needs to formulate the request, or in this case the series of requests, one for each employee name, in the correct syntax. The application program then needs to assemble the received data into a coherent form and display it to a user. The application program for even this simple function is complicated: the program must know about the structure of the tables in the database, must be able to generate a variety of database requests in the particular syntax of the database management program, must be able to process the data received, and must be able to assemble the data and display it on a user interface.

Database application program writing may be simplified by using object oriented programming techniques. Objects can be constructed that perform input and output functions such as requesting data from a database manager program or displaying data on a user interface. An application program therefore need not be provided with code for handling these lower level functions. The application program can let appropriate objects take care of these and other requirements. Writing the application program is simplified.

Object oriented programming environments provide tools to programmers such as predefined object classes that can simplify the building of applications.

One prior art set of tools and resources for an object oriented programming environment that can be used to build database applications is Enterprise Objects Framework 1x (TM), a set of tools and resources for the NEXTSTEP (TM) object oriented programming environment from NeXT Computer, Inc.

The architecture and data flow of an Enterprise Objects Framework 1x application is shown in FIG. 1. In the application shown in FIG. 1, data flows from a relational database 100 to a user interface 160, and vice versa, via a number of intervening modules and levels. Each of the blocks shown in FIG. 1 constitutes a portion of the overall application program and may be made up of one or more objects.

The flow of data from the relational database 100 to user interface 160 proceeds as follows. Data in the form of rows of data from relational database 100 are retrieved from relational database 100 to an adaptor level 110, using well-known relational database access techniques. At adaptor level 110, the raw data received from relational database 100 is packaged into "dictionary objects." Dictionary objects contain key-value pairs: each key typically represents the name of a database column, and the key's value corresponds to the data for the column of the particular row that was read from relational database 300. As shown in FIG. 1, data in the form of these dictionary objects is passed from adaptor level 110 to database level 120.

Database level 120 creates "enterprise objects" from the dictionary objects. Enterprise objects are like other objects used in object oriented programming languages in that they couple data with methods for operating on that data. However, under Enterprise Objects Framework 1x, an enterprise object has certain characteristics that distinguish it from other object classes. An enterprise object has properties that map to stored data, and an instance of an enterprise object typically corresponds to a single row or record in a database. Further, an enterprise object knows how to interact with other parts of the Enterprise Object Framework to give and receive values for its properties The ingredients that make up an enterprise object are its class definition and the data values for the row or record to which it corresponds. The enterprise object also contains pointers to other enterprise objects created from rows of related database tables. These other enterprise objects typically contain yet other pointers to other related objects. The entire set of enterprise objects used by an application program thus forms an interconnected graph of data bearing enterprise objects. This graph constitutes a particular view of the underlying database.

The enterprise objects created at database level 120 are passed from database level 120 to data source 130. Data source 130 is an object that has the ability to fetch, insert, update and delete enterprise objects. As such it is both a source and a sink for enterprise objects. Changes made by data source 130 to an enterprise object are passed down via database level 120 and adaptor level 110 to relational database 100 so that a corresponding change is made to the database for a change made to an enterprise object. The data source 130 does not know the structure of the underlying database. Those details are taken care of by adaptor level 110. Accordingly, as long as the appropriate adaptor 110 is used, the same data source 130 can be used for a variety of different databases.

Data source 130 supplies enterprise objects created at database level 120 to controller 140. As shown in FIG. 1, controller 140 transports data in the form of values from the enterprise objects to user interface 160 via association objects 150. Controller 140 coordinates the values displayed in the user interface with the corresponding enterprise object values. When enterprise objects are modified in the user interface, controller 140 tells data source 130, which is responsible for propagating changes to relational database 100.

In Enterprise Objects Framework 1x, changes to enterprise objects must be made by editing values in the user interface or by using the controller method "setValues:for Object:." Because enterprise objects typically include the business logic needed for the application, it would be useful if enterprise objects could be worked on by an application program in the same way most objects are worked on: i.e. by sending an enterprise object an appropriate message. However, because the integrity of the underlying database must be maintained, certain procedures performed on enterprise objects, such as procedures that make changes to the data in an enterprise object, must be specially handled. For example, changes made directly by sending a message to an enterprise object in Enterprise Objects Framework 1x bypass controller 140. Accordingly, as controller 140 controls messages to the user interface 160 and the database level 120, these changes are not updated in the user interface and are not saved in the database. In order for these changes to propagate to the user interface and the database, the enterprise object itself must keep track of changes and must explicitly notify controller 140 when changes occur. This requirement requires additional code in each enterprise object, making the building of enterprise objects, and applications using enterprise objects, more complicated and time consuming than other kinds of object oriented programming.

Another limitation of Enterprise Objects Framework 1x is that because controller 140 is tightly coupled to user interface 160, controller 140 is not usable for database server and other non-user interface applications. Accordingly, buffering and undo functions that are implemented in controller 140 in Enterprise Objects Framework 1x are not available for applications written for server platforms.

SUMMARY OF THE INVENTION

The present invention comprises a novel system for managing changes to a graph of data bearing objects. In one embodiment, an object graph manager object referred to as an editing context is used to identify changes made to data bearing enterprise objects and to notify other interested objects when changes occur. As a result, data bearing objects need not themselves contain code necessary for monitoring changes. In this embodiment, a data bearing object broadcasts a "willChange" message to a list of observer objects, one of which is the editing context, prior to undergoing any changes. Upon receiving the "willChange" message, the editing context takes a "snapshot" of the object prior to the change. After the change is made, and the change is to be committed to the database, the editing context takes a second snapshot of the object. The editing context uses snapshot differencing to identify the change that occurred, and then records the change in the database. The editing context also registers other objects, for example user interface objects, that need to be notified if the object has changed, and notifies these registered objects when a change occurs.

In another embodiment of the invention, the snapshots recorded by the editing context are used to provide event-based "undo" capabilities. In this embodiment, a change event begins, and a data bearing object about to be changed broadcasts a "willChange" message. The editing context receives the "will Change" message and takes a snapshot The editing context ignores succeeding "willChange" messages from the object until the change event is completed. At that point, the editing context records the snapshot on an undo stack. This way, undo's are bracketed by a "willChange" message and the end of a change event. Intermediate changes are not recorded.

In another embodiment of the invention, each enterprise object has a primary key that is used to maintain the identification between an enterprise object instance and a corresponding database row. In this embodiment, the editing context monitors the creating of new enterprise objects to insure that another instance of an enterprise object is not created when a row with the same primary key is fetched from the database.

In another embodiment of the invention, multiple levels of editing contexts are used to provide multiple isolated object graphs, each of which allows independent manipulation of the underlying data bearing objects. In this embodiment, an underlying editing context provides objects from its object store to one or more overlying editing contexts. Each of the overlying editing contexts creates and manages its own object store containing copies of the objects in the underlying editing context. Changes can be made to objects in an overlying object graph without effecting the state of the same objects in the underlying object graph or in the other object graphs. When a change is final, the change can be passed down to the underlying editing context, and passed up to the other overlying object graphs.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

Figure 2:
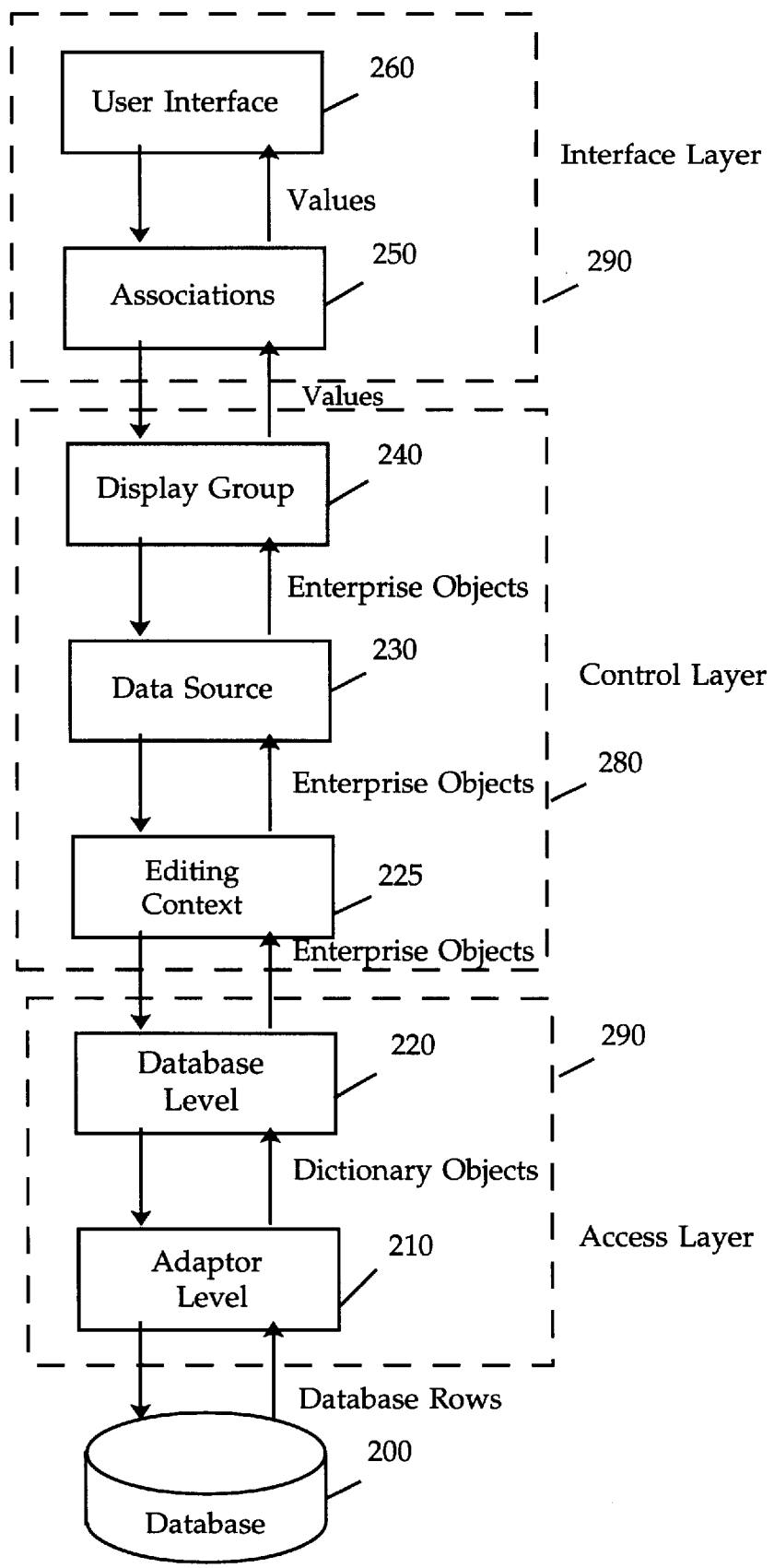
FIG. 2 is a block level diagram illustrating one embodiment of a database application of the present invention.

The general structure of one embodiment of a database application program utilizing the present invention is shown in FIG. 2. This embodiment is used in the Enterprise Objects Framework 2.0 database application programming package from NeXT Software, Inc., assignee of the present invention. Enterprise Objects Framework 2.0 is described in the Enterprise Objects Framework Developer Guide, preliminary release, attached hereto as Appendix A.

Figure 1:
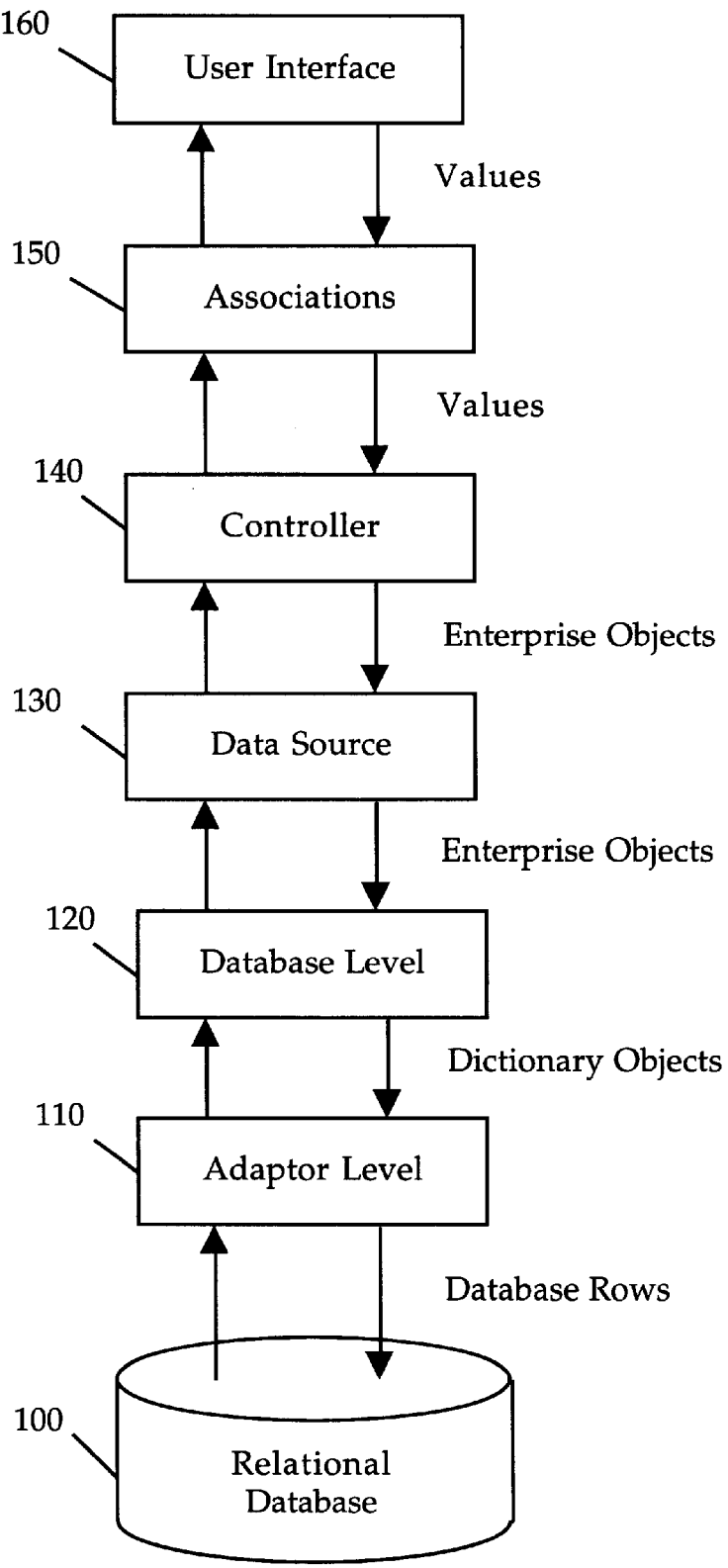
FIG. 1 is a block level diagram illustrating a database application of the prior art.

In the application shown in FIG. 2, like in the prior art application shown in FIG. 1, data flows from a relational database 200 to a user interface 260, and vice versa, via a number of intervening modules and levels. Each of the blocks shown in FIG. 2 constitutes a portion of the overall application program and may be made up of one or more objects. Although certain of the modules shown in FIG. 2 are similar to those shown in FIG. 1, there are certain significant differences, as outlined below.

The modules shown in FIG. 2 are a database 200, and adaptor level 210, a database level 220, an editing context 225, a data source 230, a display group 240, associations 250, and user interface 260. As shown in FIG. 2, these modules are divided into three layers. Database 200, adaptor level 210, and database level 220 constitute access layer 270. Editing context 225, data source 230, and display group 240 constitute control layer 280. Associations 250 and user interface 260 constitute interface layer 290.

The flow of data from the relational database 200 to user interface 260 proceeds as follows. Data in the form of rows of data from relational database 200 are retrieved from relational database 200 to an adaptor level 210, using well-known relational database access techniques. Adaptor level 210 consists of an adaptor that translates database requests received from database level 220 to the correct syntax and format for the particular database 200 being accessed. For example, if database 200 is an Oracle database, an Oracle adaptor level 210 is used. If data base 200 is a Sybase database, a Sybase adaptor level 210 is used. In this way, every module above adaptor level 210 is database independent.

At adaptor level 210, the raw data received from relational database 200 is packaged into "dictionary objects." Dictionary objects contain key-value pairs: each key typically represents the name of a database column, and the key's value corresponds to the data for the column of the particular row that was read from relational database 200. As shown in FIG. 2, data in the form of these dictionary objects is passed from adaptor level 210 to database level 220.

Database level 220 creates "enterprise objects" from the dictionary objects. Unlike the embodiment of FIG. 1, the enterprise objects of the present invention need not have any special knowledge about the underlying database or need to include methods for monitoring changes, other than being able to send "willChange" messages, as described below. In addition, unlike the embodiment of FIG. 1, in which the enterprise objects created at database level 120 were passed directly to data source 130, in the embodiment of FIG. 2, there is an additional module, editing context 225, between database level 220 and data source 230. As will be discussed in detail below, editing context 225 provides many of the inventive features of the present invention. Enterprise objects created at database level 220 are passed from database level 220 to editing context 225.

Editing context 225 functions as the manager of the object graph created by the application of FIG. 2 from database 200. Important functions performed by editing context 225 include object uniquing, user interface notification, change notification, change tracking, save notification, and providing undo capabilities.

Upon receiving an enterprise object from database level 220, editing context 225 registers each enterprise object in a lookup table, using its primary key or other unique identifier to uniquely identify the object to the external database 200, as part of its uniquing function to ensure that only one enterprise object is created in the object graph managed by editing context 225 for each database row.

Enterprise objects in Enterprise Object Frameworks 2.0 have the ability to register any other object as an observer. An observer is an object that is interested in any changes made to the objects with which it is registered as an observer. Editing context 225 registers itself as an observer of each enterprise object that is part of its object graph.

Data source 230 is an object that acts as an interface between display group 240 and editing context 225. It forwards requests for insertion and deletion of objects from display group 240 to editing context 225. Changes made by editing context 225 to an enterprise object are passed down via database level 220 and adaptor level 210 to relational database 200.

Display group 240 acts as the interface between interface layer 290 and control layer 280. It is the mechanism by which interface layer 290 accesses stored data. Editing context 225 supplies enterprise objects created at database level 220 via data source 230 to display group 240. As shown in FIG. 2, display group 240 transports data in the form of values from the enterprise objects to user interface 260 via association objects 250. Display group 240 coordinates the values displayed in the user interface with the corresponding enterprise object values. When enterprise objects are modified in the user interface, editing context 225 tracks the changes, and propagates changes, as appropriate, to relational database 200.

Figure 3:
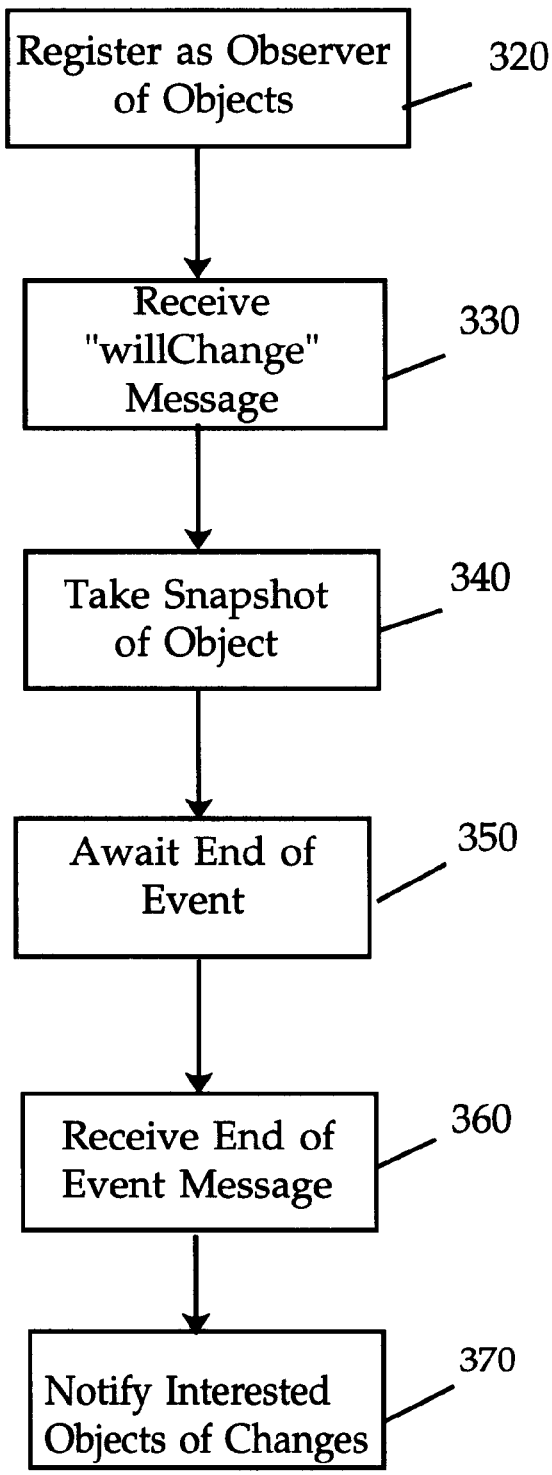
FIG. 3 is a block diagram showing how the editing context of one embodiment of the present invention performs the functions of change tracking and notification.

FIG. 3 is a block diagram showing how the editing context of one embodiment of the present invention performs the functions of change tracking and notification. As shown in FIG. 3, at block 320, the editing context registers itself as an observer of all enterprise objects in its object graph. This ensures that any enterprise object that is about to undergo a change will first send a "willChange" message to the editing context. In the embodiment shown in FIG. 3, the editing context receives such a "willChange" message from an enterprise object about to undergo a change event at block 330.

After receiving a "willChange" message, the editing context records a snapshot of the object that sent the message at block 340. At block 350, the editing context awaits the receipt of an end of event message indicating the end of the event that caused the issuance of the "willChange" message.

The generating of "willChange" and end of event messages may for example proceed as follows. The operating system of the computer system using the embodiment of FIG. 3 receives notification of an event. Events may have a variety of forms, depending on the operating system. Examples of events are user events such as moving a mouse, clicking a mouse button, or pressing a key, as well as network events such as remote procedure calls or other network messages.

After receiving notification of an event, the event manager of the operating system in turn sends notification of the event to the application code. The application code then executes as appropriate in response to the event. If, as part of the execution of the application code, a change is made to an enterprise object, the enterprise object broadcasts a "will-Change" message to its observer objects, including the editing context. Upon receiving the "willChange" message, the editing context sends the event manager of the operating system a message requesting that the editing context be called back by the operating system after the execution of the application code triggered by the event has been completed. The application code executes to completion, and the operating system sends the editing context a message indicating the end of the event.

Once the editing context receives an end of event message at block 360, the editing context broadcasts a change message at block 370 to those other objects that have registered themselves with the editing context as observers of the changed object. In certain situations, for example when it is desired to preserve referential integrity, such as by propagating deletes, the editing context may at this point also take a second, post change snapshot of the object.

Figure 4:
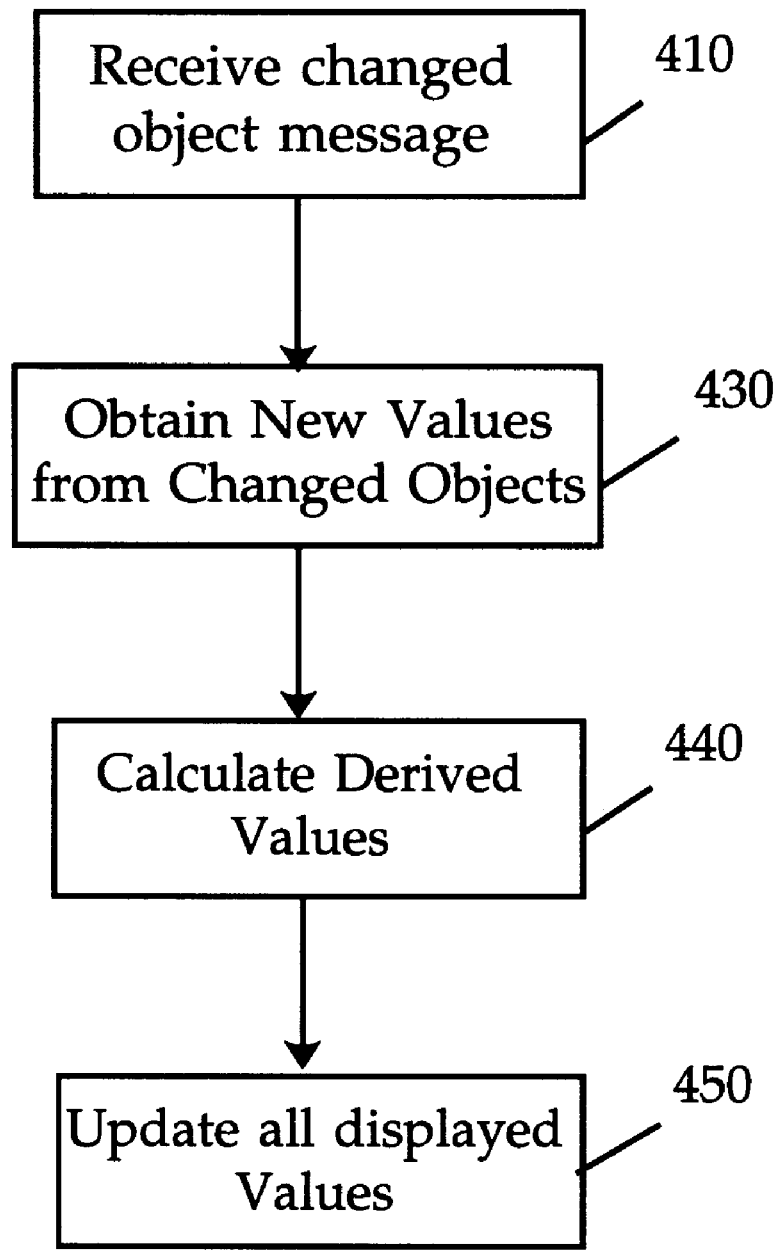
FIG. 4 is a block diagram showing how the user interface is updated in response to an update message from the editing context in one embodiment of the present invention.

In order to ensure that the user interface is updated properly in response to changes made to an enterprise object, display group 240 may register itself as an observer with the editing context. Display group 240 is therefore notified when any enterprise objects whose values are displayed on the user interface are changed Display group 240 can then update all of the values in the display. The purpose updating all the displayed values is to ensure that all values displayed in the user interface reflect the change made to the enterprise object. Some of the values displayed in the interface may be derived values calculated from the changed data. If only the changed data is updated in response to the changed data message sent by the editing context at block 370, but not any displayed data derived from the changed data, then the data displayed in the user interface would be inconsistent. By updating all the data displayed in the user interface, the display group assures that the user interface is consistent FIG. 4 is a block diagram showing how the user interface is updated by the display group in response to an changed object message from the editing context in one embodiment of the present invention. As shown in FIG. 4, display group receives a message indicating changes made to an enterprise object, corresponding to the message sent by the editing context at block 370 of FIG. 3, at block 410. The user interface then obtains the new values for the changed enterprise object at block 430. In one embodiment, the changed values are contained in the message received from the editing context at block 410. In another embodiment, the message received from the editing context at block 410 contains the identity of the changed object but not the changes themselves. In this embodiment, the user interface obtains the changed values by querying the changed enterprise object directly.

After obtaining the changed values, the user interface calculates any derived values at block 440. Finally, all values displayed by the user interface are updated with at block 450.

Figure 5:
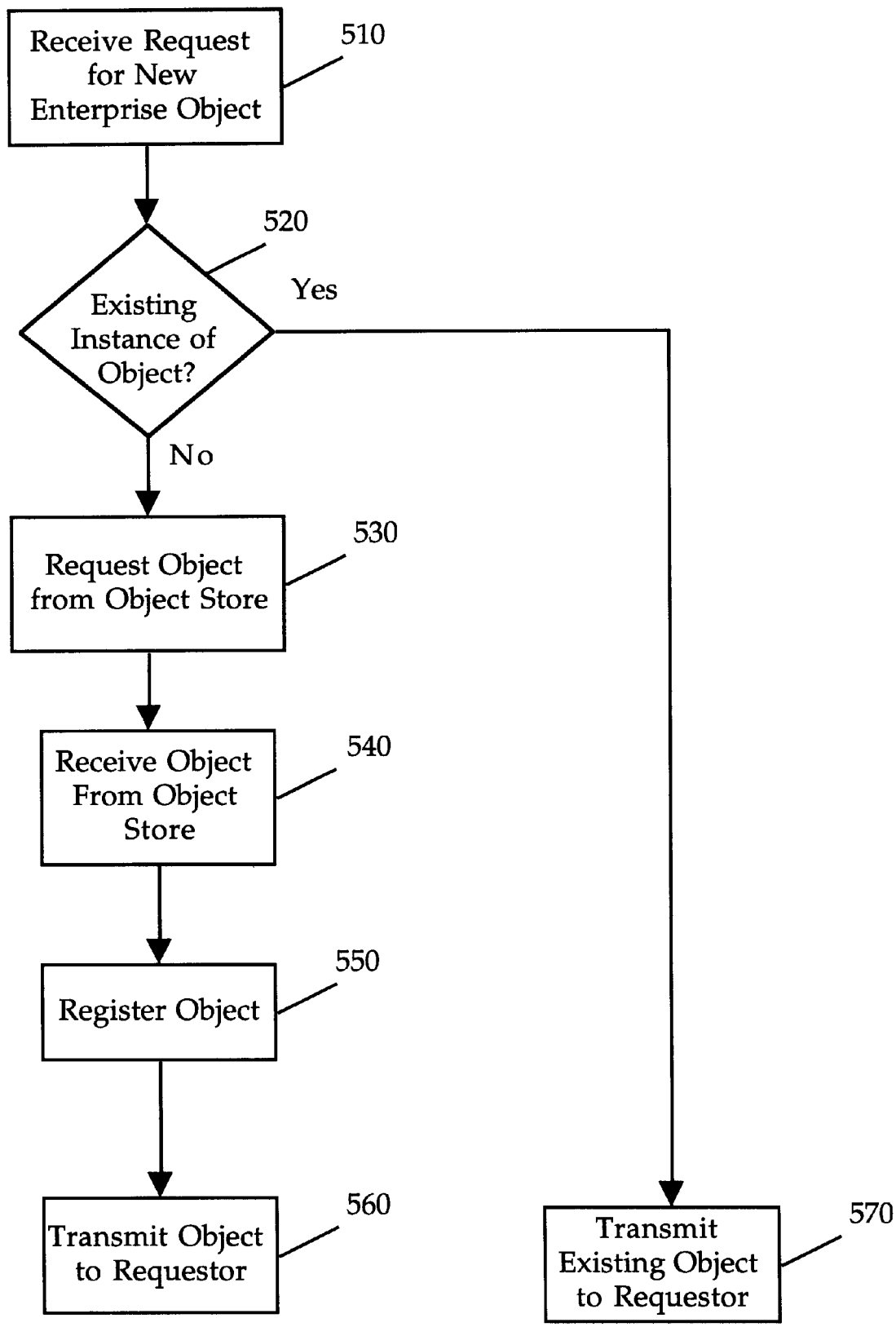
FIG. 5 is a block diagram showing how one embodiment of the editing context of the present invention performs the function of object uniquing.

FIG. 5 is a block diagram showing how one embodiment of the editing context of the present invention performs the function of object uniquing. As shown in FIG. 5, the editing context receives the request for a new enterprise object at block 510. This request may come, for example, from data source 230 of FIG. 2. After receiving the request, the editing context checks to see whether an instance of the requested object already exists at decision block 520. If an instance of the object already exists, the editing context transmits the existing object to the requester at block 570. If no instance of the object exists, the editing context passes a request for the object from its underlying object store, which may consist, for example, of database level 220, adaptor level 210, and database 200 of FIG. 2. After receiving the requested object from the object store at block 540, the editing context registers a unique identifier of the object at block 550 and transmits the new object to the requester at block 560.

Figure 6:
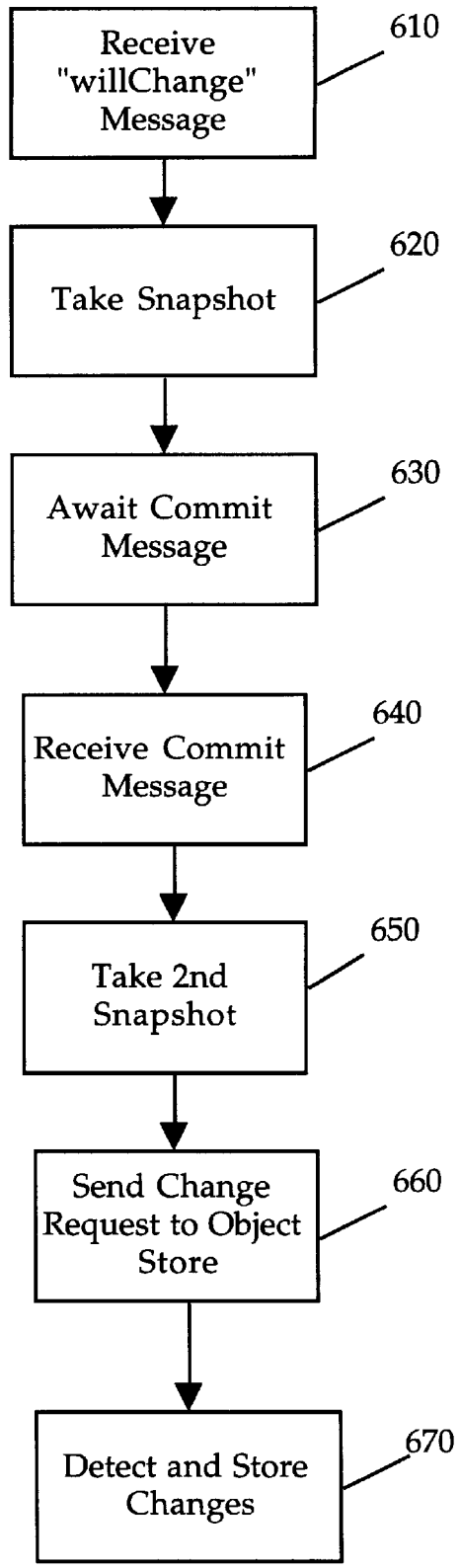
FIG. 6 is a block diagram showing how one embodiment of the editing context of the present invention performs the function of saving changes to enterprise objects.

FIG. 6 is a block diagram showing how one embodiment of the present invention performs the function of detecting and saving changes to enterprise objects in the underlying database or other object store. As shown in FIG. 6, after the editing context receives a "willChange" message from an enterprise object at block 610, the editing context takes a snapshot of the object in its unchanged state at block 620. The editing context then awaits a commit message indicating that a change has been completed and that the changed data is to be committed to the database at block 630. The editing context may receive additional "willChange" messages from the enterprise object between the time it receives the initial "willChange" message and the commit message, but these additional "willChange" messages are ignored. After the editing context receives a commit message at block 640, the editing context takes a second snapshot of the enterprise object at block 650. At block 660, the editing context sends a change request to the object store to save the change made to the enterprise object. The object store detects the change by comparing the first and second snapshots and stores the change at block 670.

In the embodiment of FIG. 2, the object store comprises the access layer 290 and database 200. The object store may also be any other entity or mechanism that appears to the editing context to function in a database level like manner: that is, it stores and retrieves enterprise object data in response to data base requests from the editing context.

Figure 7:
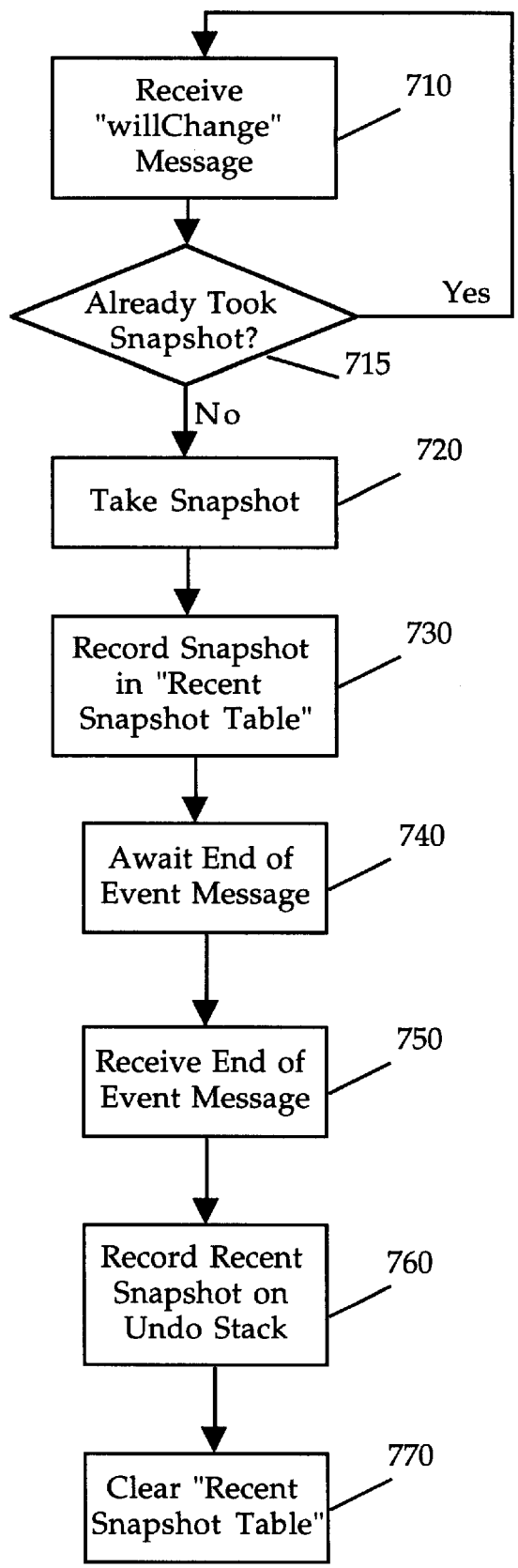
FIG. 7 is a block diagram showing how one embodiment of the editing context of the present invention provides undo functionality.

FIG. 7 is a block diagram showing how one embodiment of the editing context of the present invention provides undo functionality. At block 710, the editing context receives a "willChange" message from an enterprise object, indicating that the enterprise object anticipates undergoing a change. At block 715, the editing context checks to see whether a snapshot for the current change event has already been taken. A change event is a set of one or more successive changes made to an enterprise object within the pre-defined limits of the change event. For example, a change event may occur when a user makes several successive changes in a user interface to observe the results. In this case, the change event would commence when the first change is entered and the enterprise object sends out an initial "willChange" message. The change event may be deemed to continue until the user activates a save command or moves a mouse pointer to another data field.

If a snapshot has already been taken during the current change event, the current "willChange" message is ignored. If no snapshot has been taken, the editing context takes a snapshot at block 720. At block 730, the editing context places the snapshot into a "recent snapshot table". The recent snapshot table acts as a holding place for the snapshot until it is placed on the undo stack, as described below.

After placing the snapshot in the recent snapshots table, the editing context awaits a end of event message, indicating that the current change event has ended, at block 740. Upon receiving the end of event message at block 750, the editing context, at block 760, records the snapshot stored in the recent snapshot table at block 730 on the undo stack. Finally, the editing context clears the recent snapshot table at block 770. The result is that the top level of the undo stack now contains a snapshot of the object prior to the changes made during the change event. The changes made can therefore be undone by changing the enterprise object back to the state reflected in the topmost snapshot in the undo stack.

The snapshots on the undo stack allow successive reversion of the state of the enterprise object to the states captured in each snapshot of the stack. By bracketing the snapshots, and therefore the captured states of the object, between the initial "willChange" message and a corresponding end of a change event, short-term, intermediate changes in the enterprise object are ignored. Instead of inefficiently filling the undo stack with every little incremental change in the state of the enterprise object, only significant changes are recorded, resulting in an efficient and fast undo facility.

In the prior art, in order to provide an undo capability, undo code had to be written into the application program, resulting in the investment of substantial coding time and effort, and creating the opportunity for a variety of errors. By using the undo facilities of the present invention described above, however, an application program automatically obtains undo capabilities without the need of complex coding and with little risk of error.

Although the user interface update, object uniquing, data saving, and undo capabilities of the editing context of the present invention have been described with respect to the separate embodiments of FIGS. 3, 5, 6, and 7, respectively, a single editing context of the present invention may provide some or all of these capabilities concurrently.

Figure 8:
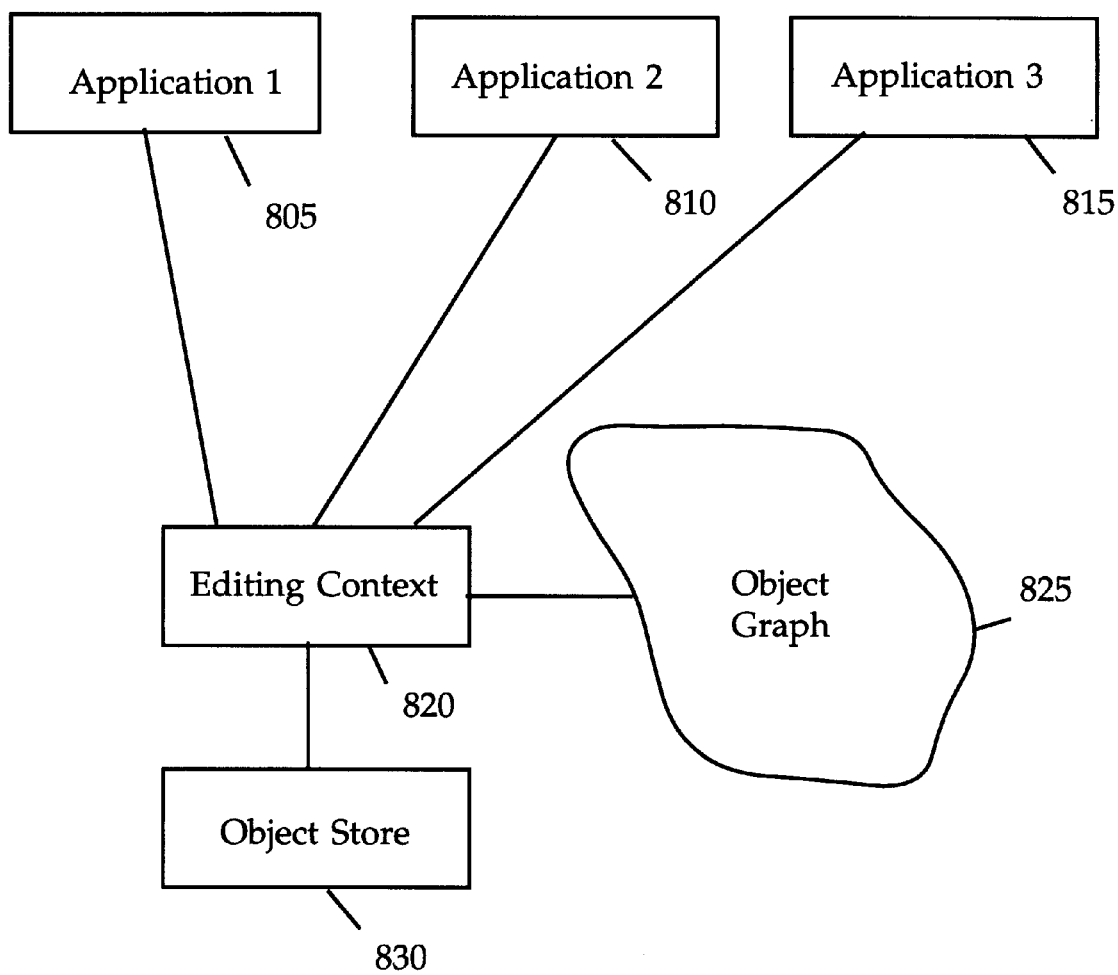
FIG. 8 is a schematic diagram showing the structure of one embodiment of the present invention.

In each of the embodiments of the present invention described above with respect to FIGS. 2–7, the editing context functions on behalf of one or more application programs as the manager of an object graph obtained from an underlying data storage entity referred to by the generic name "object store". This basic structure is shown in FIG. 8, which shows editing context 820 managing object graph 825 on behalf of applications 805, 810 and 815.

Object graph 825 represents a particular view of the database structure underlying object store 830. From the point of view of editing context 820, object store 830 represents a source of new objects and a sink for changed objects. As described above, object store 830 may consist of the access layer 290 and database 200 of FIG. 2. However, object store 830 may consist of other entities and/or systems that can respond to requests from editing context 820 to perform database functions related to object graph 825 managed by editing context 820.

Figure 9:
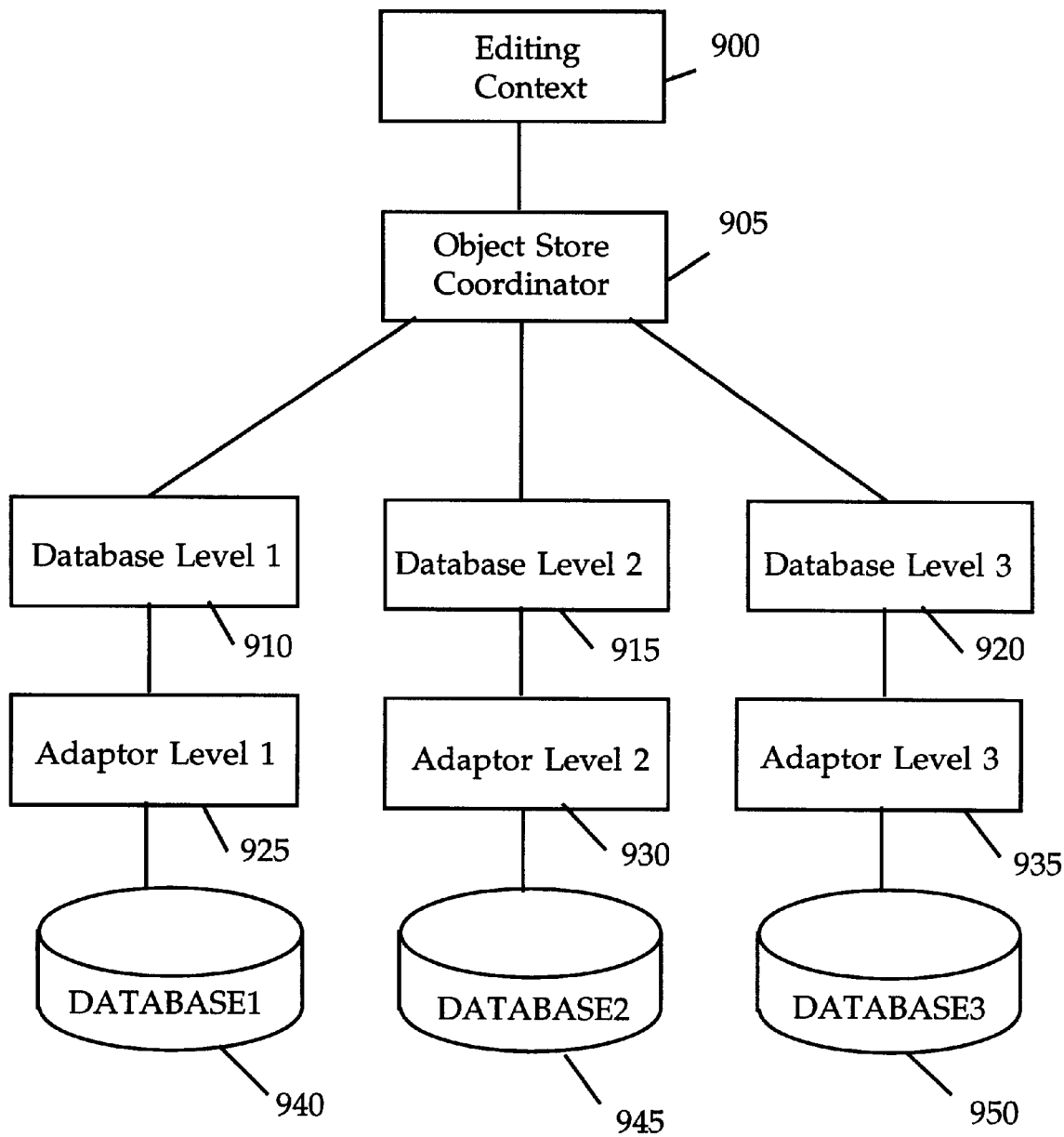
FIG. 9 is a schematic diagram showing the structure of one embodiment of the object store of the present invention including multiple adaptor levels and multiple databases.
Figure 10:
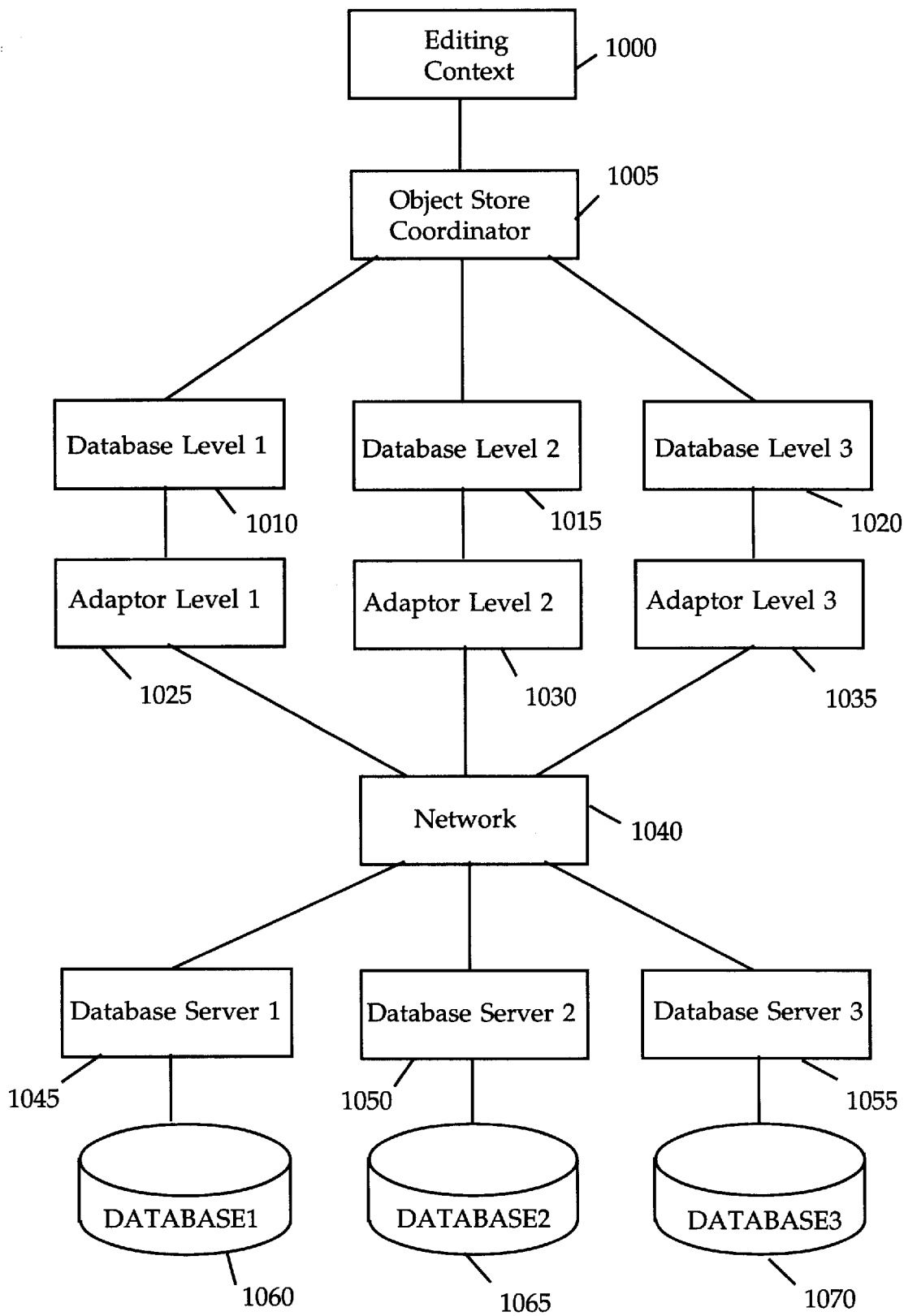
FIG. 10 is a schematic diagram showing the structure of one embodiment of the object store of the present invention including multiple network linked databases.

FIGS. 9-10 illustrate example embodiments of structures that can be used as object store 830. From the point of view of the editing context, each of these embodiments looks the same.

FIG. 9 is a schematic diagram showing the structure of one embodiment of the object store of the present invention including multiple adaptor levels and multiple databases. In this embodiment, the object store consists of an object store coordinator 905, three different databases 940, 945, and 950, respectively, three corresponding adaptor levels 925, 930, and 935, respectively, and three corresponding database levels 910, 915, and 920, respectively. The three databases may be managed by different database management systems. For example, database 940 may be an Oracle database, database 945 may be a Sybase database, and database 950 may be another database. Object store coordinator 905 coordinates database requests received from editing context 900, decides which database corresponds to each request received, and sends the appropriate message to the appropriate database level, which, via the corresponding adaptor level, performs the database function requested. If the request from editing context 900 involves updating data contained in an enterprise object, object store coordinator 905 identifies the database corresponding to the changed data and sends an appropriate message to the corresponding database level. If the request from editing context 900 involves the creation of a new enterprise object, object store coordinator 905 performs the required object to database mapping and extracts the appropriate data from one or more of the databases.

In the embodiment of FIG. 9, the multiple databases are all part of a single computer system. However, the databases may be spread over different machines in a computer network, as shown in FIG. 10.

The embodiment of FIG. 10, like the embodiment of FIG. 9, includes an editing context 1000, an object store coordinator 1005, three database levels 1010, 1015, and 1020, and three corresponding adaptor levels 1025, 1030, and 1035. The embodiment of FIG. 10 also include three different databases 1060, 1065, and 1070. However, instead of being directly connected to their corresponding adaptor levels, databases 1060, 1065, and 1070 are distributed over a network, and managed by separate database servers 1045, 1050, and 1055, respectively. Accordingly, instead of directly accessing a connected database as in FIG. 9, in the embodiment of FIG. 10, an adaptor level contacts its corresponding database by sending a network message to the appropriate database server. In this embodiment, object store coordinator 1005 coordinates database requests received from editing context 1000, decides which database corresponds to each request received, and sends an appropriate message to the applicable database level. The database level transmits a corresponding message to its adaptor level, which formulates the appropriate network message to the appropriate database server to perform the database function requested. If the request from editing context 1000 involves updating data contained in an enterprise object, object store coordinator 1005 identifies the database corresponding to the changed data and sends an appropriate message to the corresponding database level. The database level sends a corresponding message to its adaptor level, which transmits an appropriate network message to the applicable database server. If the request from editing context 1000 involves the creation of a new enterprise object, object store coordinator 1005 performs the required object to database mapping and extracts the appropriate data from one or more of the databases, again via the applicable database level, adaptor level, network, and database server. Again, the complexities underlying editing context 1000 are hidden. Editing context 1000 interacts with object store coordinator 1005 in the same manner as with database level 220 in the simple structure of FIG. 2.

Figure 11:
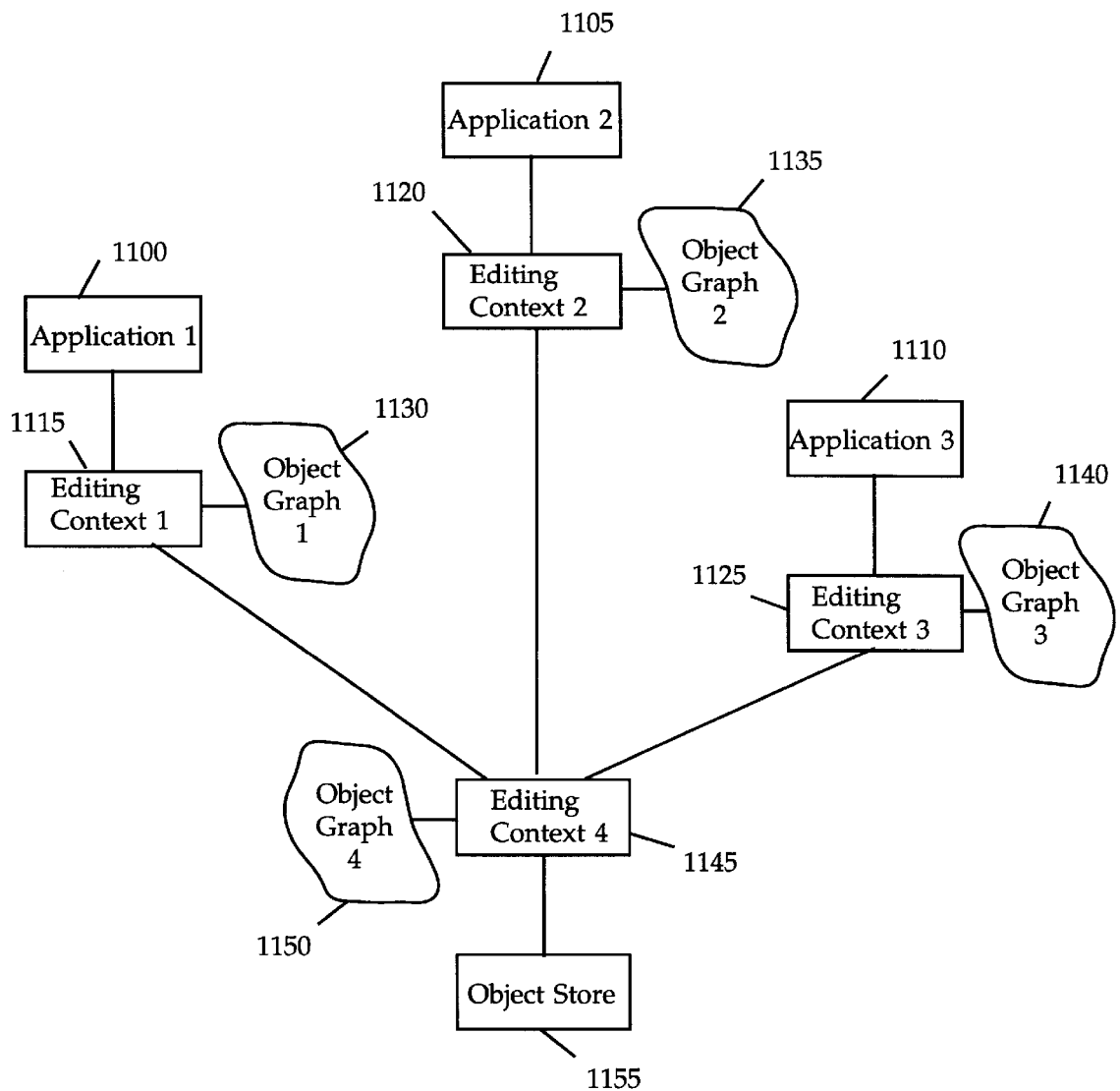
FIG. 11 is a schematic diagram showing the structure of one embodiment of the present invention including multiple nested editing contexts.

FIG. 11 is a schematic diagram showing the structure of one embodiment of the present invention including multiple nested editing contexts. This embodiment is similar to the embodiment of FIG. 8. However, instead of having an editing context 820 managing an object graph 825 for multiple applications 805, 810 and 815, as in FIG. 8, in the embodiment of FIG. 11, editing context 1145 manages object graph 1150 on behalf of three other editing contexts 1115, 1120 and 1125, respectively. Each of these other editing contexts manages its own object graph on behalf of its own application, which may be a separate application program, but more typically is a separate task being performed by a single application program. For example, each application may consist of a separate window looking at different or the same views of the underlying data. As such, editing context 1115 manages object graph 1130 on behalf of application 1100, editing context 1120 manages object graph 1135 on behalf of application 1105, and editing context 1125 manages object graph 1140 on behalf of application 1110. To each of editing contexts 1115, 1120, and 1125, editing context 1145 looks like an object store 830 of FIG. 8. Conversely, each of editing contexts 1115, 1120 and 1125 looks to editing context 1145 of FIG. 11 like an application program 805, 810, or 815 of FIG. 8. Each of editing contexts 1115, 1120 and 1125 manages a separate object graph 1130, 1135, and 1140, respectively. Object graphs 1130, 1135, and 1140 constitute independent views of the data provided by editing context 1145. As each object graph is created independently, there may be multiple instances of enterprise objects spread across object graphs 1130, 1135 and 1140, respectively. Each of applications 1100, 1105 and 1110 can therefore independently work and make changes to separate instances of the same enterprise objects. When an application program 1100, 1105 or 1110 wishes to commit a change to the database, a commit change to database message is sent to editing context 1145. Editing context 1145 then updates the appropriate enterprise objects in its object graph 1150, and also broadcasts a change message to editing contexts 1115, 1120 and 1125, respectively. Editing contexts 1115, 1120 and 1125 may or may not pass these changes on to their respective applications 1100, 1105 and 1110, depending on the particular configuration and purpose of the application programs. Editing context 1145 does not commit the changes to underlying object store 1155 unless it receives an explicit message to do so. Each of the editing contexts 1115, 1120, 1125 and 1145 may in general perform any of the functions for an editing context described with respect to FIGS. 2–7.

The nested editing context structure of FIG. 11 provides a simplified means for creating-a database application program utilizing "drill down user interfaces." Drill down user interfaces consist, for example, of a series of pop-up windows that can be used to make changes to data displayed in a window. For example, a window may display the employees of a department, their salaries, and department budget data. A department manager may wish to be able to investigate various "what if" scenarios without actually changing the underlying database. An application program may be designed to allow the manager to pop up a second window in which the manager can make various changes in the displayed data to see what the resultant effects are. When the manager is satisfied with the changes, a command button might be provided to commit the changes to the database.

In the prior art, designing such an application was complex. To create the pop-up window, the application had to copy values from the underlying database objects to local variable, which would be displayed in the pop up window. The application would also have to recreate the validation methods of the underlying objects and take into account any derived values. Once changes to the local variables were to be committed, the application would have to manually harvest the changed values and transmit them to the underlying objects.

The present invention provides a much less complex way to design drill down interfaces. By using nested editing contexts and thereby creating independent copies of the underlying enterprise objects, instead of having to create and deal with local variables, the enterprise objects themselves can be manipulated in a pop-up window. Accordingly, the same code can be used to manipulate data in the pop up window as is used in the main window Because the user operates on copies of the objects, instead of on derived local variables, all methods of the object are preserved. The present invention thus provides a simpler and less error prone way to create application programs using drill down interfaces.

Figure 12:
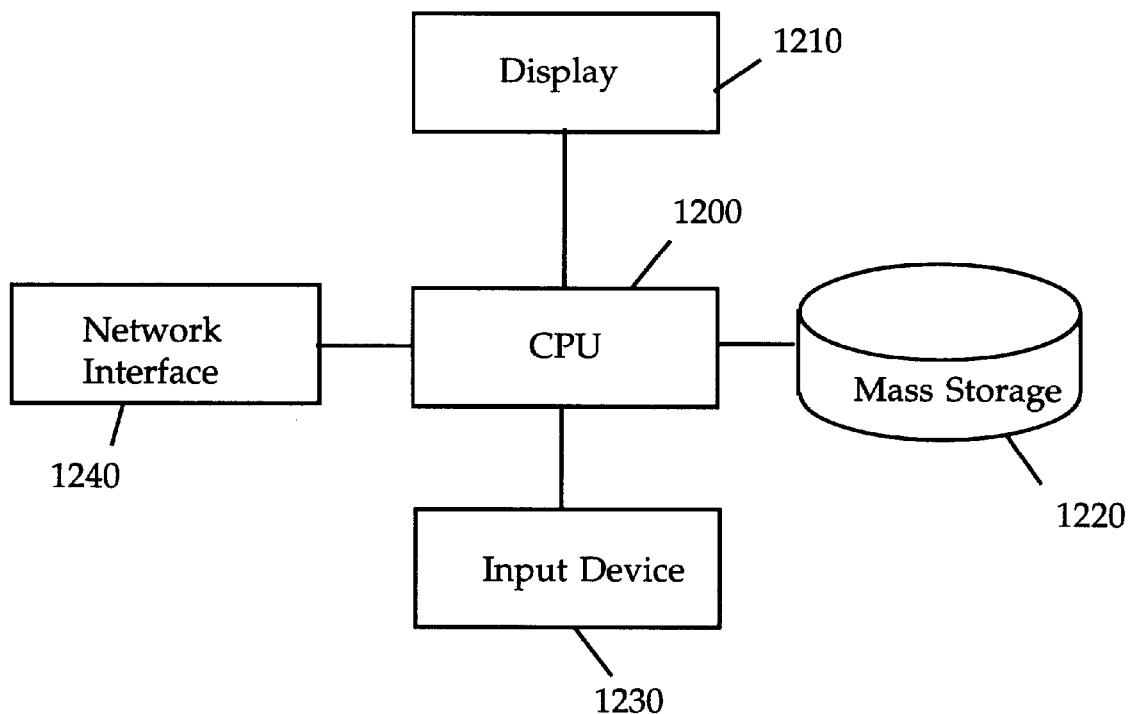
FIG. 12 is a schematic diagram of one embodiment of a computer system on which the present invention may be implemented.

The present invention can be implemented by means of software programming on any of a variety of one or more computer systems as are well known in the art, including, without limitation, computer systems such as that shown in FIG. 12. The computer system shown in FIG. 12 includes a CPU unit 1200 that includes a central processor, main memory, peripheral interfaces, input-output devices, power supply, and associated circuitry and devices; a display device 1210 which may be a cathode ray tube display, LCD display, gas-plasma display, or any other computer display; an input device 1230, which may include a keyboard, mouse, digitizer, or other input device. The computer system may or may not include non-volatile storage 1220, which may include magnetic, optical, or other mass storage devices. The computer system may also include a network interface 1240 allowing the computer system to communicate with other systems over a communications network. Any of a variety of other configurations of computer systems may also be used.

Thus a novel method and apparatus for managing an object graph of data bearing objects was presented. Although the present invention has been described with respect to certain example embodiments, it will be apparent to those skilled in the art that the present invention is not limited to these specific embodiments.

We claim:

1. In a computer system, a method for monitoring changes made to an object graph comprising a plurality of data bearing objects containing data from a database comprising the steps of:

prior to making any change to a first data bearing object in said object graph in response to an event that initiates execution of application code, transmitting a message indicating that said first data bearing object expects to undergo a change from said first data bearing object to an object graph manager;

taking a snapshot of said first data bearing object upon said object graph manager receiving said message indicating said expected change;

making one or more changes to said first data bearing object during said execution of application code in response to said event;

transmitting a message indicating an end of said execution of application code in response to said event to said object graph manager.

2. The method of claim 1 further comprising the steps of:

transmitting a message indicating that said first data bearing object has undergone a change from said object graph manager to an interested object.

3. The method of claim 2 wherein said interested object is an object registered with said object graph manager as an object to be informed of any changes to said first data bearing object.

4. The method of claim 1 wherein said step of transmitting a message indicating that said first data bearing object expects to undergo a change comprises the steps of:

registering said object graph manager as an observer with said first data bearing object;

broadcasting said message indicating that said first data bearing object expects to undergo a change from said first data bearing object to registered observers of said data bearing object.

5. The method of claim 2 wherein said interested object comprises a user interface manager object managing values displayed in a user interface, and further comprising the steps of:

after said user interface manager object has received said message indicating that said first data bearing object has undergone a change, transmitting a message from said user interface manager object to said first data bearing object requesting values for data of said first data bearing object;

transmitting said values for said data of said first data bearing object from said first data bearing object to said user interface manager object, updating said values displayed in said user interface corresponding to said values for said data of said first data bearing object.

6. In a computer system, a method for modifying a database in accordance with changes made to an object graph comprising a plurality of data bearing objects containing data from said database comprising the steps of:

prior to making any change to a first data bearing object in said object graph, transmitting a message indicating an expected change to said first data bearing object to an object graph manager;

taking a snapshot of said first data bearing object upon said object graph manager receiving said message indicating said expected change;

making one or more changes to said first data bearing object;

transmitting a commit message to said object graph manager requesting that changes made to said first data bearing object be committed to said database;

taking a second snapshot of said first data bearing object upon said object graph manager receiving said commit message;

detecting said one or more changes to said first data bearing object by comparing said second snapshot to said first snapshot;

storing data corresponding to said detected one or more changes in said database.

7. The method of claim 6 wherein said step of storing data corresponding to said detected one or more changes in said database comprises the step of sending a change request from said object graph manager to an object store.

8. The method of claim 7 wherein said object store comprises an object store coordinator that interfaces between said object graph manager and a plurality of databases.

9. The method of claim 8 wherein said plurality of databases comprise databases distributed over a computer network.

10. In a computer system, a method for undoing changes made to an object graph comprising a plurality of data bearing objects containing data from a database comprising the steps of:

prior to making any change to a first data bearing object in said object graph in response to an event that initiates execution of application code, transmitting a message indicating that said first data bearing object expects to undergo a change from said first data bearing object to an object graph manager;

taking a snapshot of said first data bearing object upon said object graph manager receiving said message indicating said expected change;

making one or more changes to said first data bearing object during said execution of application code in response to said event;

transmitting a message indicating an end of said execution of application code in response to said event to said object graph manager;

recording said snapshot on an undo stack.

11. The method of claim 10 further comprising the step of determining whether a previous snapshot of said data bearing object has already been taken during said execution of application code in response to said event prior to taking said snapshot of said data bearing, and taking said snapshot only if no such previous snapshot has been taken.

12. The method of claim 10 further comprising the steps of:

recording said snapshot in a recent snapshot table after taking said snapshot;

clearing said recent snapshot table after recording said snapshot on said undo stack.

13. A program storage device readable by a machine, tangibly embodying a program of instructions executable by the machine to perform method steps for monitoring changes made to an object graph comprising a plurality of data bearing objects containing data from a database, said method steps comprising the steps of:

prior to making any change to a first data bearing object in said object graph in response to an event that initiates execution of application code, transmitting a message indicating that said first data bearing object expects to undergo a change from said first data bearing object to an object graph manager;

taking a snapshot of said first data bearing object upon said object graph manager receiving said message indicating said expected change;

making one or more changes to said first data bearing object during said execution of application code in response to said event;

transmitting a message indicating an end of said execution of application code in response to said event to said object graph manager.

14. The program storage device of claim 13 in which said method steps further comprise the steps of:

transmitting a message indicating that said first data bearing object has undergone a change from said object graph manager to an interested object.

15. The program storage device of claim 14 wherein said interested object is an object registered with said object graph manager as an object to be informed of any changes to said first data bearing object.

16. The program storage device of claim 13 wherein said step of transmitting a message indicating that said first data bearing object expects to undergo a change comprises the steps of:

registering said object graph manager as an observer with said first data bearing object;

broadcasting said message indicating that said first data bearing object expects to undergo a change from said first data bearing object to registered observers of said data bearing object.

17. The program storage device of claim 14 wherein said interested object comprises a user interface manager object managing values displayed in a user interface, and wherein said method steps further comprise the steps of:

after said user interface manager object has received said message indicating that said first data bearing object has undergone a change, transmitting a message from said user interface manager object to said first data bearing object requesting values for data of said first data bearing object;

transmitting said values for said data of said first data bearing object from said first data bearing object to said user interface manager object, updating said values displayed in said user interface corresponding to said values for said data of said first data bearing object.

18. A program storage device readable by a machine, tangibly embodying a program of instructions executable by the machine to perform method steps for modifying a database in accordance with changes made to an object graph comprising a plurality of data bearing objects containing data from said database, said method steps comprising the steps of:

prior to making any change to a first data bearing object in said object graph, transmitting a message indicating an expected change to said first data bearing object to an object graph manager;

taking a snapshot of said first data bearing object upon said object graph manager receiving said message indicating said expected change;

making one or more changes to said first data bearing object;

transmitting a commit message to said object graph manager requesting that changes made to said first data bearing object be committed to said database;

taking a second snapshot of said first data bearing object upon said object graph manager receiving said commit message;

detecting said one or more changes to said first data bearing object by comparing said second snapshot to said first snapshot;

storing data corresponding to said detected one or more changes in said database.

19. The program storage device of claim 18 wherein said step of storing data corresponding to said detected one or more changes in said database comprises the step of sending a change request from said object graph manager to an object store.

20. The program storage device of claim 19 wherein said object store comprises an object store coordinator that interfaces between said object graph manager and a plurality of databases.

21. The program storage device of claim 20 wherein said plurality of databases comprise databases distributed over a computer network.

22. A program storage device readable by a machine, tangibly embodying a program of instructions executable by the machine to perform method steps for undoing changes made to an object graph comprising a plurality of data bearing objects containing data from a database, said method steps comprising the steps of:

prior to making any change to a first data bearing object in said object graph in response to an event that initiates execution of application code, transmitting a message indicating that said first data bearing object expects to undergo a change from said first data bearing object to an object graph manager;

taking a snapshot of said first data bearing object upon said object graph manager receiving said message indicating said expected change;

making one or more changes to said first data bearing object during said execution of application code in response to said event;

transmitting a message indicating an end of said execution of application code in response to said event to said object graph manager;

recording said snapshot on an undo stack.

23. The program storage device of claim 22 wherein said method steps further comprise the step of determining whether a previous snapshot of said data bearing object has already been taken during said execution of application code in response to said event prior to taking said snapshot of said data bearing, and taking said snapshot only if no such previous snapshot has been taken.

24. The program storage device of claim 22 wherein said method steps further comprise the steps of:

recording said snapshot in a recent snapshot table after taking said snapshot;

clearing said recent snapshot table after recording said snapshot on said undo stack.

* * * * *